Oct. 20, 1931.  W. A. MARSCHKE  1,828,540
BUFFER OR GRINDER
Filed Feb. 11, 1926  2 Sheets-Sheet 1
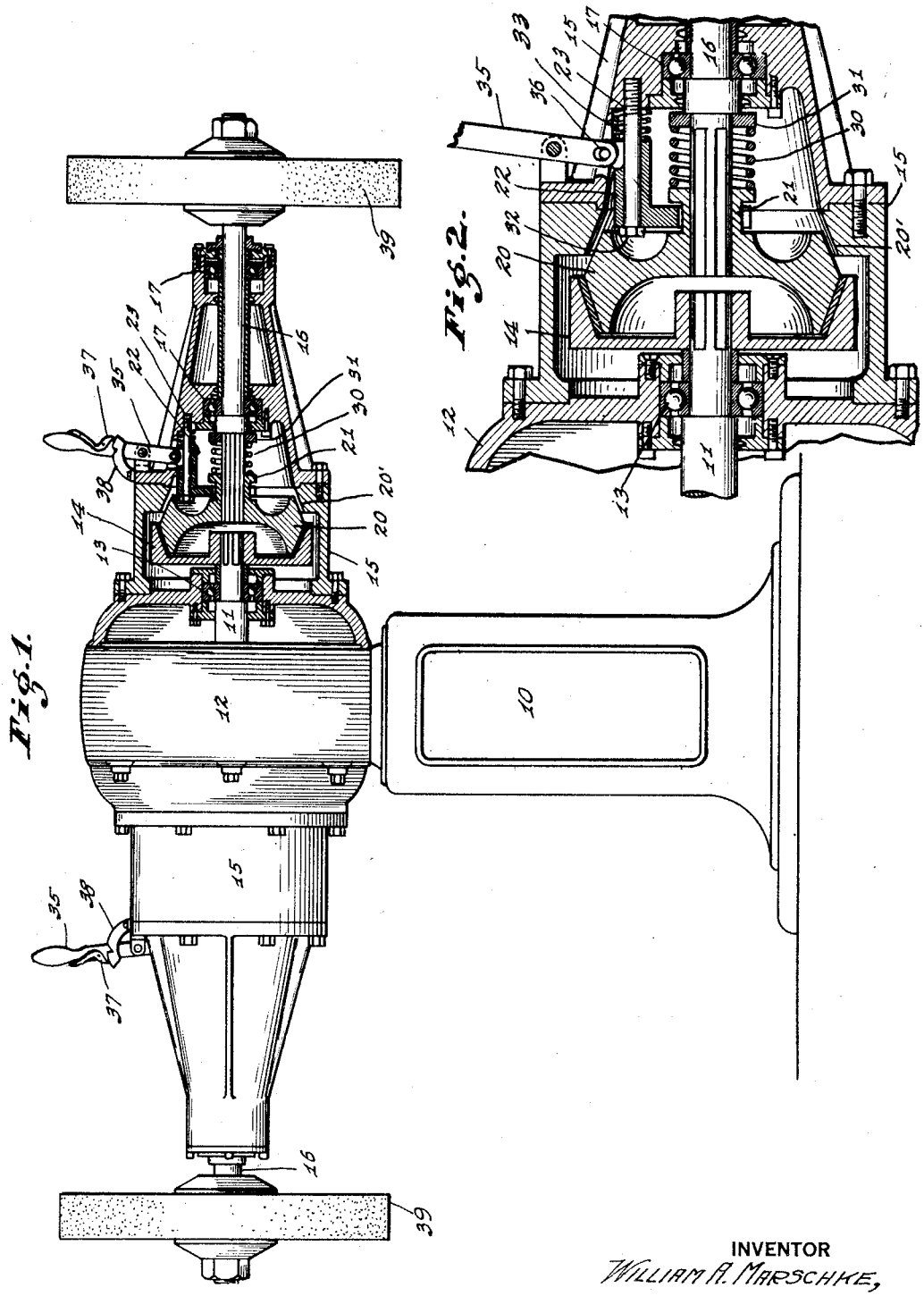
INVENTOR
*William A. Marschke*,
BY
ATTORNEY

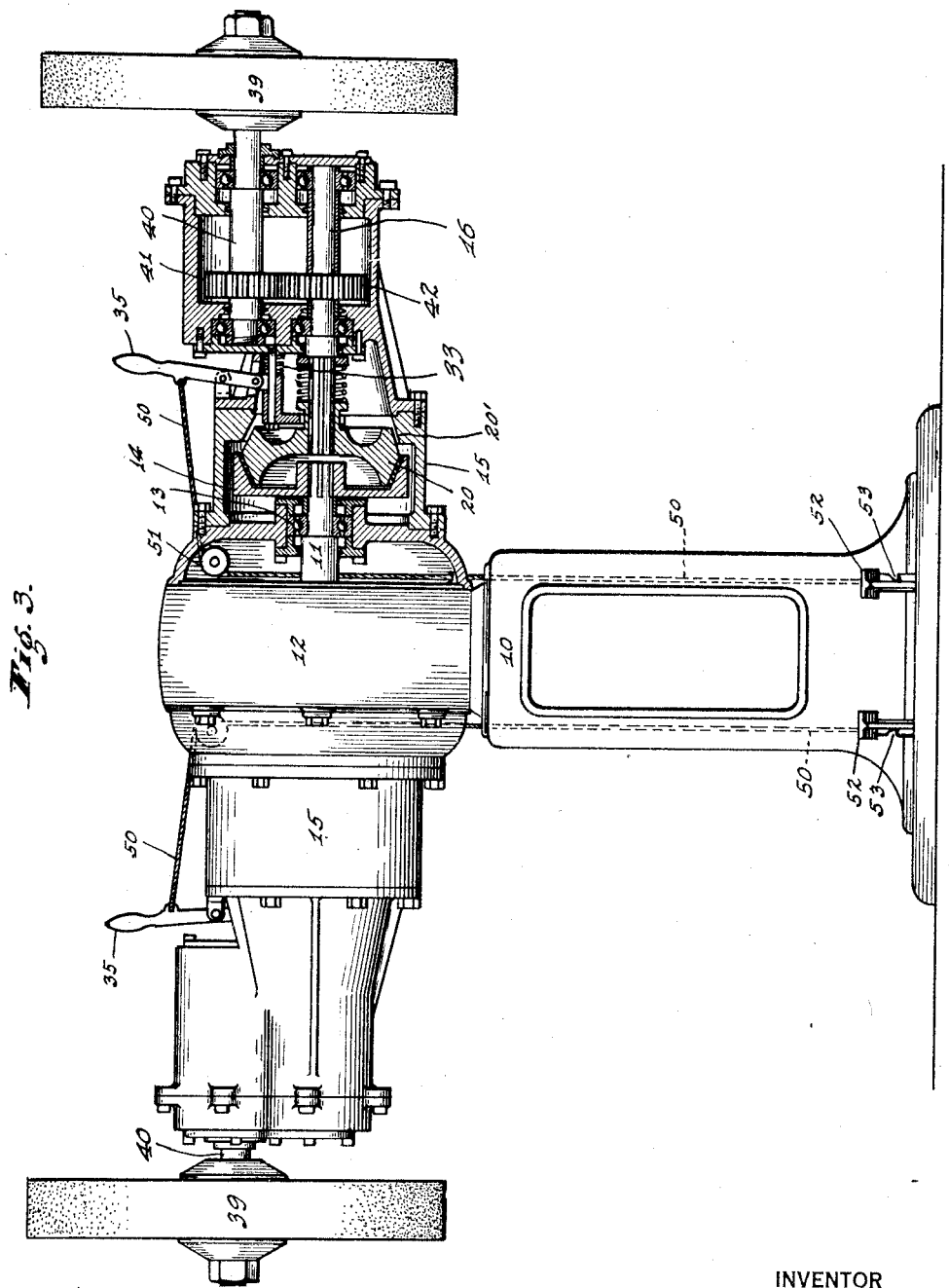

Patented Oct. 20, 1931

1,828,540

UNITED STATES PATENT OFFICE

WILLIAM A. MARSCHKE, OF INDIANAPOLIS, INDIANA, ASSIGNOR TO MARSCHKE MANUFACTURING COMPANY, OF INDIANAPOLIS, INDIANA, A CORPORATION OF INDIANA

BUFFER OR GRINDER

Application filed February 11, 1926. Serial No. 87,657.

Emery wheels or buffing wheels used for grinding and polishing are frequently mounted in pairs on opposite sides of a suitable stand. In the usual type of mounting, two wheels are mounted on opposite ends of a horizontal shaft, or on separate shafts which are connected together, so that the wheels will rotate together. The shaft or shafts which carry the wheels are driven by any suitable means, as, for instance, a direct-connected electric motor.

Such a buffer or grinder has a decided disadvantage particularly when both wheels are being used simultaneously; for when it becomes necessary to stop one wheel for the purpose of changing it or for any other reason, the other wheel is also stopped. This, as it renders the user of the other wheel idle, is an undesirable and expensive occurrence.

It is the object of my invention to overcome the difficulties and to eliminate the undesirable features present in the usual type of two-wheel buffers or grinders. More specifically, it is my object to provide such a buffer or grinder with means whereby either wheel may be disconnected from the source of power without interfering with the operation of the other wheel. A further object of my invention is to provide a means for holding either wheel-spindle stationary when it is disconnected from the source of power.

I accomplish the above objects by mounting two emery or buffing wheels on individual spindles, and I provide each of such spindles with means for connecting or disconnecting it with or from a power-driven shaft. Preferably, each of such connecting means is arranged to lock its associated spindles to the supporting frame when the spindle is not connected to the power-driven shaft.

The accompanying drawings illustrate my invention: Fig. 1 is a front elevation, a partial section, of a two-wheel stand embodying my invention; Fig. 2 is a fragmental section on an enlarged scale illustrating details of construction; and Fig. 3 is a view similar to Fig. 1 of a stand in which gearing is employed to increase the rotational speeds of the two wheels.

My device comprises a base or stand 10 from which is rotatably supported a power-driven, horizontal shaft 11. I have illustrated the shaft 11 as being the armature shaft of an electric motor located in the casing 12, but the shaft 11 may be driven by any desired means. Preferably, the shaft 11 is supported in suitable anti-friction bearings, such as the ball bearings 13. Each end of the shaft 11 extends outward beyond the bearing 13 and is provided with a clutch member 14 which is rigidly connected to the shaft 11, as by means of the splines illustrated.

A suitable housing 15 is attached to either side of the casing 12 and extends outward to form a support for a shaft 16 which is rotatably mounted, preferably in anti-friction bearings 17. Each of the shafts 16 is co-axial with the power-driven shaft 11 and is provided at its inner end with a clutch member 20 adapted to co-operate with the clutch member 14 on the adjacent end of the shaft 11.

The clutch member 20 is connected to the shaft 16, as by means of splines illustrated, so that it will rotate with such shaft but will be slidable axially thereon into and out of engagement with the clutch member 14. For the purpose of holding the spindles 16 stationary when the clutch 14—20 is disengaged, the clutch member 20 is provided with an outwardly converging conical face adapted to engage the complementary conical inner surface of a flange 20' on the casing 15.

For the purpose of shifting the clutch member 20 along the shaft 16, the hub 21 of such clutch member is provided with an annular groove adapted to receive a shifting-yoke 22 which is slidably mounted on a horizontal guide such as the screw 23.

As in the normal operation of the grinder or buffer, both of the shafts 16 will be connected to the power-driven shaft 11, I prefer to provide a spring 30 which acts between the clutch member 20 and a collar 31 on the spindle 16 to hold the clutch member 20 in engagement with the clutch member 14. Desirably, that part of the shifting yoke 22 which lies in the groove of the hub 21 of the clutch-member 20 is thinner than the width of such groove so that the yoke may occupy a position in which it does not bear against either side of the groove when the clutch member 20 is engaged with the clutch member 14. To retain the yoke 22 in an intermediate position and out of contact with the walls of the groove in the hub 21, the screw 23 is provided with an abutment, which is conveniently the head 32 of such screw, located in such a position that the yoke 22 when it engages the head 32, will be out of contact with the walls of the groove in the hub 21. To hold the yoke 22 against the screw-head 32, I provide a coil spring 33 which acts between the casing 15 and the yoke 22.

For the purpose of shifting the yoke 22 along the screw 32, a clutch-shifting lever 35 is pivotally mounted on the casing 15 and is provided at its lower end with a slot for the reception of a pin 36 carried by the yoke 22. To retain the clutch-member 20 in disengaged position against the pressure exerted by the springs 30 and 33, the clutch-shifting lever 35 is provided with a pawl 37 which is pivotally mounted in position to engage a notch in a quadrant 38 when the shifting lever 35 has been moved sufficiently to bring the clutch member 20 into engagement with the flange 20'.

In the device illustrated in Fig. 1 the shafts 16 serve as wheel spindles and have the emery or buffing wheels 39 mounted directly on their outer ends. If it is desired to have either or both wheels rotate at a speed different from that of the shaft 11, a construction such as that illustrated in Fig. 3 may be employed.

In the construction illustrated in Fig. 3, the wheels 39, instead of being mounted directly on the shafts 16, are mounted on wheel-spindles 40 which are connected respectively to the shafts 16 by gears 41 and 42. Either or both of the wheels 39 may be mounted either on the shafts 16 as illustrated in Fig. 1 or on separate wheel-spindles as illustrated in Fig. 3.

In Fig. 3 a slightly different means is provided for shifting the clutch member 20. In this construction a cable 50 is connected to the shifting lever 35 and extends over a pulley 51 to a pedal 52 which is mounted in the base 10. When the pedal 52 is depressed, the clutch member 20 is withdrawn from engagement with the clutch member 14 and engages the flange 20'. To retain the clutch member 20 in this position against the force exerted by the springs 30 and 33, the pedal 52 is arranged so that it can be moved horizontally beneath an abutment 53 in the base 10. To release the pedal, it is moved horizontally out of engagement with the abutment 53 and permitted to rise under the influence of the springs 30 and 33.

I claim as my invention:—

The combination for the purposes described of a drive shaft, a driven shaft, a driven clutch member on said driven shaft and rotatable therewith, a driving clutch member on said drive shaft, a stationary member, said driven clutch member being axially slidable along said driven shaft to engage either said stationary member or said driving clutch member, spring means normally controlling said driven clutch member as to its engagement with said driving clutch member, said driven clutch member being provided with a hub having an annular groove, a slidable shifting-yoke having a portion lying in said groove, that portion of said shifting-yoke which lies in said groove being less in thickness than the width of said groove, an abutment for limiting the movement of said yoke, spring means acting on said yoke to hold it against said abutment, said abutment being located so that when said yoke engages it the portion of said yoke which lies in the peripheral groove in said hub will be free from contact with the walls of said groove, and means for shifting said yoke.

In witness whereof, I have hereunto set my hand at Indianapolis, Indiana, this 6th day of February, A. D. one thousand nine hundred and twenty-six.

WILLIAM A. MARSCHKE.